No. 776,094. PATENTED NOV. 29, 1904.
W. B. SMITH.
FILTER DEVICE.
APPLICATION FILED MAR. 13, 1903.
NO MODEL.
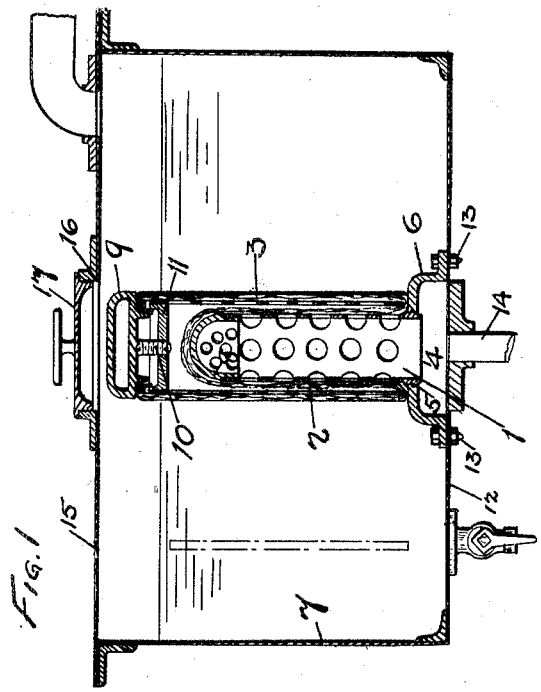
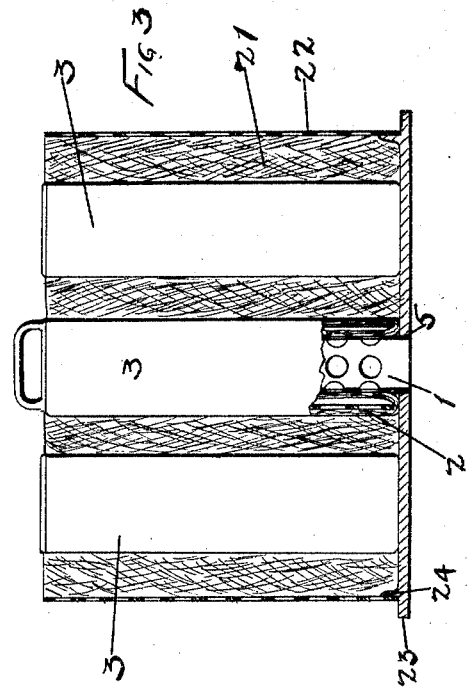
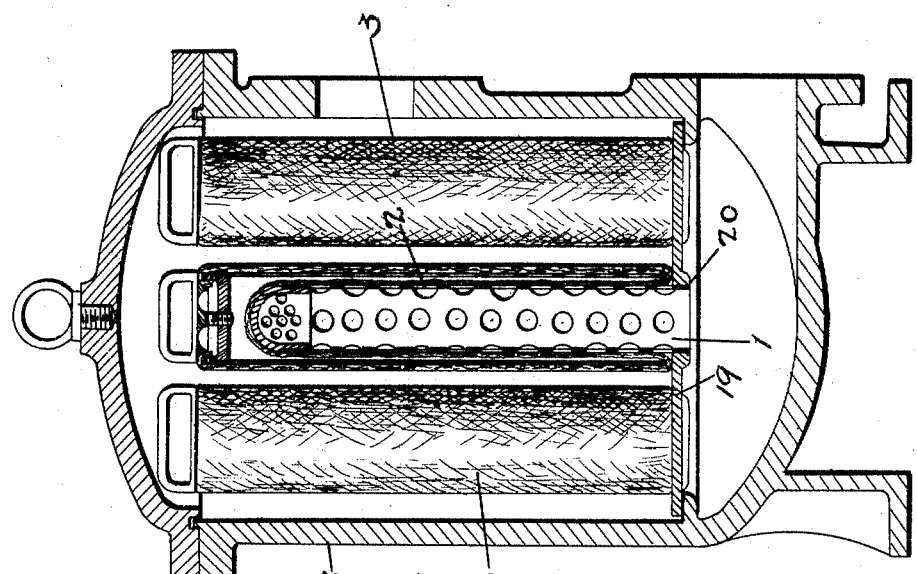
WITNESSES:
INVENTOR
William Blackburn Smith
BY
Alexander C. Proudfit
ATTORNEY No. 776,094.	Patented November 29, 1904.

UNITED STATES PATENT OFFICE.

WILLIAM BLACKBURN SMITH, OF PERTH AMBOY, NEW JERSEY.

FILTER DEVICE.

SPECIFICATION forming part of Letters Patent No. 776,094, dated November 29, 1904.

Application filed March 13, 1903. Serial No. 147,620. (No model.)

*To all whom it may concern:*

Be it known that I, WILLIAM BLACKBURN SMITH, of Perth Amboy, New Jersey, have invented certain Improvements in Filter Devices, of which the following description, in connection with the accompanying drawings, is a specification, like numerals on the drawings designating like parts.

This invention relates to filtering apparatus, and more particularly to a "filter-cartridge," as I term the perforated support with its surrounding filtering medium, which in various forms is used in a number of different types of filtering apparatus, a single cartridge being often used in a comparatively close-fitting case or a plurality of cartridges being used with suitable connections in a larger case or tank.

The object of my invention is to provide such a device in which arrangements are made to secure the advantage of double filtration without occupying an unduly large space in the casing or tank, an important feature of the invention being the arrangement by which this double filtration is secured with a single filter-cloth or the like, so that the renewal of the filtering medium can be accomplished in practically half the time necessitated by the use of devices now on the market.

Briefly described, my invention comprises a plurality of coaxially-arranged tubular supports capable of assemblage in telescopic relation, the filtering medium taking the form of a tube of toweling or the like passed around the outside of the outer tube and of sufficient length to extend back within the outer tube far enough to cover the inner tube, and preferably closed at its inner end, so that when in place around the outer tube the members of the cartridge may be quickly assembled in operative position by thrusting the outer tube upon the inner tube, this act stretching the inner part of the tube of filtering medium over the periphery of the inner supporting-tube, so that upon admission of water or other fluid to be filtered, either from the outside of the tubes or from the inside thereof, the fluid will pass through first one portion of the tube of filtering material, then one of the supporting-tubes and its portion of the filtering-tube, then the other supporting-tube, or vice versa, accordingly as the fluid is introduced from the outside of the cartridge or from the inside thereof.

The various features of my invention will be illustrated and described fully in the accompanying drawings and specification and pointed out in the claims.

In the drawings, Figure 1 is a view in vertical section of a filter in the construction of which my improvements have been embodied. Fig. 2 is a similar view showing a plurality of my improved cartridges in a modified form of casing; and Fig. 3 is a view in section, with parts in elevation, of a modified cartridge.

In the embodiment of my invention selected for illustration and description as a convenient form to enable a ready and complete understanding of my improvements the part designated by the reference-numeral 1 is one form of what is herein referred to as the perforated "inner" filtering tube or support, the reference-numeral 2 designates the outer perforated tube, and the numeral 3 the tube of filtering medium, these numerals being carried through all the drawings, as there is no substantial difference in the construction of these parts.

Any suitable form of casing or holding means for the cartridge may be used, and the latter may be connected thereto in any suitable way; but I contemplate as one convenient form of such holding means a case 7 with a base member 6 and a connection for the inner tube 1, formed by an extension 4 of the outer end thereof of sufficient length to extend through the aperture 5 or through an aperture in some part of the case 7, into which aperture the extension may be expanded or screwed or otherwise secured.

Preferably the free portion of the inner tube will be closed, as by a cap, plug, or the like 8, having a rounded smooth surface, preferably perforated, to receive the inner end of the tube 3 of filtering material, the form of which may be varied, as found desirable. The other end of the tube of filtering material may be secured near the outer end of the outer tube 2 in any convenient manner, as by a handle 9, screwed into a suitable aperture 10 in a cap or closure 11 at the outer end of the outer tube, this handle cramping the end of the tube of filtering material against the outer end of the outer tube, between which and the handle it is tucked, but the handle being easily unscrewed to allow removal of said tube of filtering material after the outer supporting-tube has by means of the handle been withdrawn from the inner supporting-tube, carrying with it the tube of filtering material.

As one form of casing for the reception of one or more of said cartridges I contemplate the use of the ordinary or any suitable filter or feed-water tank commonly found on vessels, in factories, or like situations, to the bottom 12 of which tank may be attached by bolts 13 or otherwise the base member already described, exit for the pure fluid being provided by tapping a pipe 14, as usual, into the bottom of the tank under said base member. Where the tank has a cover 15, it may be convenient to provide a hand-hole 16 with a removable cover 17 directly over the handle of each cartridge. Where a plurality of devices are to be used in a single casing, as at 18, a plate 19 may be provided with a plurality of apertures 20, into which may be expanded or screwed or otherwise secured the inner members 1 of the respective cartridges. I contemplate also the provision of such a cartridge or plurality of cartridges surrounded by a suitable fibrous material 21, (see Fig. 3,) such as the coir or cocoanut fiber, especially useful as a mud-filter, and where this is utilized I prefer to provide a perforated tube, ring, or wall 22, within which and around the cartridge or cartridges the coir may be packed, this outer tube being supported in any suitable way, as by a base member 23, provided with a rim or flange 24 to receive the tubular or other perforated wall and pierced to provide apertures into which may be expanded or screwed or otherwise secured the members of the cartridge or cartridges. It will be understood that with such a construction the fluid will preferably be introduced from the exterior of the surrounding wall, passing first through the coir to remove the mud or larger particles of matter in suspension and thereafter through the individul cartridges, from the inner supporting-tubes of which, if double-filtration cartridges are used, the pure fluid will find exit.

Having illustrated and described my invention thus fully, it will be understood that I do not limit myself to the exact construction shown and described nor in general otherwise than as pointed out in the claims read in connection with this specification.

What I claim, and desire to secure by Letters Patent, is—

1. A filter device comprising a cylindrical inner foraminous supporting-tube, an outer supporting-tube arranged to receive said inner tube telescopically, and a cylindrical tube of filtering medium extended, when said tubes are in operative position, over the periphery of said outer tube, around one end thereof, and back between said tubes, and arranged to insure double filtration of fluid passing through said device, substantially as described.

2. A filter device comprising an inner foraminous supporting-tube, an outer foraminous tube arranged to receive said inner tube telescopically, and a tube of filtering medium secured near the outer end of said outer tube and of sufficient length to extend over the periphery of said outer tube and back within the same over the periphery of said inner tube when said tubes are in place, said outer tube and tube of filtering medium being removable freely from said inner tube, substantially as described.

3. A support for filtering medium for devices of the class described, comprising a foraminous supporting-tube, to receive peripherally a tube of filtering medium, and a handle member having means to engage said tube of filtering medium and secure the same in place, substantially as described.

4. A filter of the class described comprising a casing, an inner supporting-tube carried thereby, an outer tube arranged to pass telescopically over said inner tube, and a tube of filtering medium carried by said outer tube and arranged to extend peripherally over each of said tubes when coaxially arranged, said filtering medium being removable with said outer tube, from said inner tube, leaving the latter in place within said case, and a removable handle at the outer end of said outer tube to secure said filtering medium to said outer tube and enable removal of the same together, substantially as described.

Signed at New York, in the county of New York and State of New York, this 6th day of March, A. D. 1903.

WILLIAM BLACKBURN SMITH.

Witnesses:
ALEXANDER C. PROUDFIT,
CHARLES F. GEHRMANN.